3,066,987
DUPLEX TYPE DISTRIBUTOR FOR COMPRESSED AIR BRAKING SYSTEMS WITH MANUAL CONTROL SYSTEM AND ADVANCE DEVICE
Giuseppe Alfieri, Milan, Italy, assignor to Fabbrica Italiana Magneti Marelli S.p.A., Milan, Italy, a firm
Filed Aug. 3, 1959, Ser. No. 831,325
Claims priority, application Italy Sept. 13, 1958
4 Claims. (Cl. 303—53)

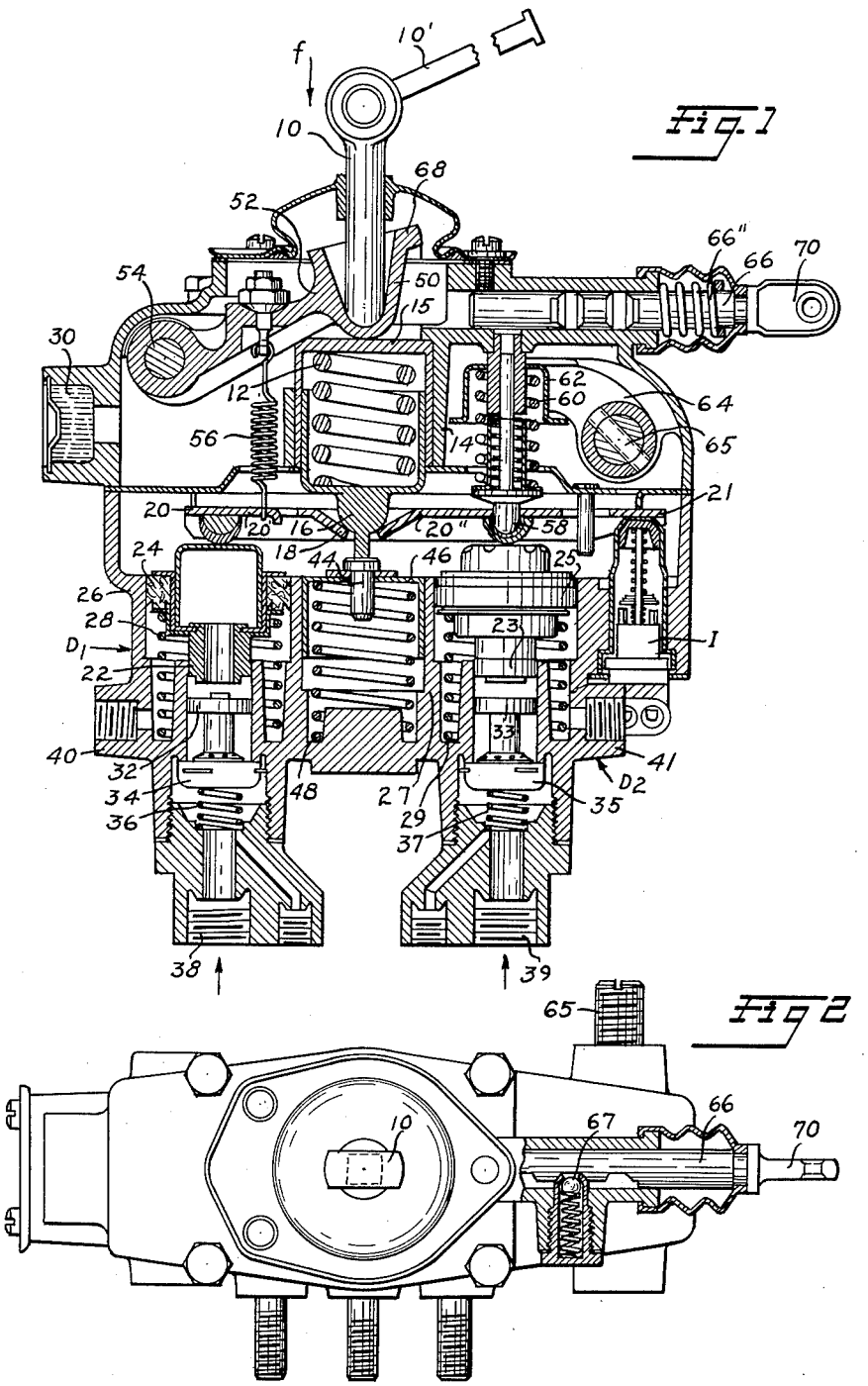

The invention relates to a duplex type compressed air distributor for braking composite vehicles, as a motor unit and a trailer unit. The compressed air distributor unit and a trailer unit. The compressed air distributor contemplated by the invention is of the type essentially comprising an operating thrust element connected to the brake pedal, an equalizer for activating the two distributing sections controlled through a regulating spring of the said thrust element and a device associated with the equalizer for hand control of one of the said two sections.

It is known that simultaneous activation of the two distributing sections, controlling the braking elements of the motor vehicle and of the towed vehicle respectively, gives rise to braking disadvantages due to the non-contemporaneous braking action effected upon the motor unit and trailer unit.

It happens, in fact, that because of the difference in length of the compressed air lines between the respective distributing sections and the brakes of the motor unit and those of the trailer unit, the motor unit is braked before the trailer unit. As a result, the relatively unbraked trailer unit has a tendency to crowd forward against the more heavily braked motor unit.

The object of the present invention is to provide a compressed air distributor for braking composite vehicles wherein compressed air may be delivered first to one unit of the composite vehicle (as the trailer unit) and then to both units, to balance the force of the compressed air supply until braking of both units is equalized.

According to the invention, such operation is obtained by incorporating in the duplex distributor of the above mentioned type an elastic device put under tension in one arm of the equalizer and a support associated with the movement of the push element, the stressed equalizer arm being opposite to the one upon which operates the manual actuating device.

Such arrangement of the elastic device permits the section of the distributor associated with the manual actuation device to begin functioning with a certain advance with respect to the other section. A further characteristic of the system is the application of a device limiting the maximum pressure in the two sections, preferably arranged at the side of the driver's seat and above the device for hand activation.

The invention is illustrated by way of example with reference to the appended drawing in which:
FIGURE 1 is a longitudinal sectional view of the distributor; and
FIG. 2 is a plan view, partially in section, of the distributor shown in FIG. 1.

In the following description, presented merely by way of example, it will be assumed that the manual actuating device is mounted at the distributing section connected with the trailer, and that the elastic device which advances braking of the trailer is mounted adjacent the distributor section connected to the motor unit.

The drawing illustrates the compressed air distributor in the position of rest; and it follows, from what has been said above, that the compressed air distributor section connected with the brakes on the trailer unit will begin to operate in advance of that section connected with the brakes of the motor unit.

Referring to the drawing, and more particularly to FIG. 1, an operating thrust element 10 is connected to a brake pedal 10' for actuation thereby. A regulating spring 12 elastically connects the thrust element with an equalizer 20 illustrated as a transverse arm. The adjusting spring is confined between two shallow cups 14 and 15, the latter being subject to the actuation of the thrust element 10, and the former acting through a rod 16 upon the equalizer 20, the end of the rod and seat of the equalizer being so formed that the equalizer may freely rotate about the rod end as a fulcrum, and at the same time being displaced by the rod upon axial movement of the thrust element 10. Furthermore, the equalizer comprises two arms 20' and 20" on opposite sides of the fulcrum point.

The movement transmitted by the equalizer 20 to the rod 16, having a pin 44 secured to a cup 46, is opposed by a special reaction spring 48, mounted within the cup, and applied at the fulcrum.

The equalizer 20 controls two compressed air distributors $D_1$ and $D_2$ with its arm portions 20' and 20", respectively. The distributor $D_1$ is connected with the brake of the motor unit and the distributor $D_2$ is connected with the trailer unit.

The distributors $D_1$ and $D_2$ are of known type and each substantially comprises a thrust element 22, 23 carried by plungers 24, 25, respectively, for controlling the inlet valve 34, 35 having sealing discs 32, 33, and biased to a closed position by spring means 36, 37; the thrust elements being slidable within cylinders 26, 27 and biased upwardly by spring means 28 and 29, respectively, said thrust elements being in communication with the atmosphere through an aperture 30 formed in the body of the distributor, the lower end of each thrust element being adapted to engage its respective sealing discs 32, 33 to thereby open the respective valve 34, 35, a feeding conduit 38, 39 and a conduit leading to the braking section 40, 41.

Adjacent the trailer distributor $D_2$, on the opposite side of the equalizer therefrom, is mounted a mechanical device 62 which can be actuated by hand through a lever 64, 65, accessible from the driver's seat. The manual effort of the driver is transmitted through said leverage and a spring 60 of the mechanical device and an actuating rod 58 acting upon the end 20" of the equalizer.

The mechanical device 62 provides manual means for independently operating the compressed air distributing section for the trailer brakes.

At the side of the trailer distributor $D_2$ is mounted parallel thereto, a switch-stop I, actuated by an extension 21 of the arm 20" of the equalizer.

According to the invention, between the equalizer arm 20" on the motor vehicle side and an extension 52 pivoted to the distributor housing at 54 and having a spherical-shaped member 50 abutting the shallow cup 15, is mounted a spring 56 under tension, articulatedly connected thereto.

In operating the device, the driver, by lowering the brake pedal moves the operating thrust element 10 in the direction of the arrow $f$. The thrust element 10 then actuates the equalizer 20 through the spring 12, and the rod 16 acting upon the seat 18 of the equalizer 20.

The presence of the tension spring 56 during this initial braking phase, acts so as to prevent the parallel or untilted displacement of the equalizer 20 and therefore the activation with balanced loads of the two distributors $D_1$ and $D_2$.

In fact, the spring 56 exerting a certain tension upon the equalizer arm portion 20' will effect, during the lowering of the thrust element 10, rotation in the right-hand direction of the equalizer about a fulcrum substantially coinciding with the point on the equalizer where it is connected to the tension spring 56.

The end 20" of the equalizer will respond to the operation of the thrust element 10, by turning in a clockwise direction as viewed in the drawing, to actuate the distributor $D_2$ and therefore the functioning of this distributor in advance of the distributor $D_1$.

In effect the latter in this first phase does not result activated in that the end 20" of the equalizer has not provoked the displacement of the thrust element 22 and, therefore, the opening of the corresponding introduction valve.

Thus, the initial tension load upon the spring 56 realizes the advance action of the brakes of the trailer unit with respect to those of the motor unit. Upon the braking action continuing, the thrust element 10 compresses the adjusting spring 12, shifting the position of the appendage 52 and causing a gradual reduction of the tension of the spring 56.

By suitably proportioning the flexibility characteristics of the springs 12 and 56, it is possible to entirely reduce, after a predetermined movement, and therefore at an established value of the delivery pressure, the tension of the said spring 56.

In the final braking phase the action of the spring 56 being equal to zero, the two distributors $D_1$ and $D_2$ become perfectly balanced.

It is to be noted that the connection of the spring 56 to the arm of the equalizer and the support of the adjusting spring on the side of the thrust element can be effected either directly, as has been illustrated in the scheme represented by the drawing, or indirectly, for instance, through a lever-shaped support pivoted at one side on the body of the apparatus and resting, at the other side, upon the upper support of the adjusting spring.

The disclosed compressed air distributor may be completed by a pressure limiting device 70, mounted above the hand control device 62 as seen in the drawing and in proximity to the actuating element 10. The limiting device permits the driver at will, to limit to a pre-established value the maximum braking pressure in both of the distributors of the apparatus. The device is substantially constituted by a rod 66, a return spring 66" and detent means 67.

In the illustrated scheme the limiting device is maintained by the detent means 67 in a position of rest, while operation of the duplex distributor takes place in a normal way. When, because the vehicle is empty, or for any other reason, the driver desires the braking actions not to exceed a predetermined intensity, for instance because the road is slippery, wet or frosted, the rod 66 is shifted to dispose the end 66' thereof below a stop plate 68, carried by the thrust element 10.

In this way, movement of the thrust element is stopped when the plate 68 touches the end 66' of the rod 66, and no further action is transmitted to the distributors. The rest and engagement position of the limiting device can be provided with a direct hand control, or with an indirect servo-control without modifying the spirit of the invention.

Furthermore, the stopping of the thrust element 10 directly by the rod 66 of the device 70, can also be indirectly effected by stopping the upper support 15 of the adjusting spring 12 or stopping the lever-shaped support for the advance spring 56.

I claim:

1. A duplex type compressed air distributor mechanism for braking composite vehicles, one unit of the composite vehicle having a brake pedal, said mechanism comprising a distributor section for each vehicle unit, an equalizer having arms positioned to make contact with and to actuate each of said distributors, a thrust element having one end connected to the brake pedal and the other end pivotally connected to a first shallow cup, a second shallow cup axially spaced from said first shallow cup, a rod having one end connected to said second shallow cup, the other end of said rod bearing upon said equalizer between its points of contact with said distributor sections and providing a fulcrum point about which said equalizer may rock, a regulating spring mounted between said first and second shallow cups urging said thrust element away from said equalizer, a tension spring operatively connected between one arm of said equalizer and said first cup urging one end of said equalizer toward the brake pedal, whereby upon moving said thrust element toward said equalizer, the one end of said equalizer contacts its distributor after the other, and upon further movement of said thrust element toward said equalizer both ends of said equalizer contact their respective distributors.

2. A compressed air distributor according to claim 1 wherein said tension spring is mounted between one arm of said equalizer and an extension provided on said first shallow cup for articulation of said spring in the mechanism.

3. A duplex type compressed air distributor mechanism for braking composite vehicles consisting of a motor unit and a trailer unit, the motor unit of said composite vehicle having a brake pedal, said mechanism comprising a distributor section for the motor unit, a distributor section for the trailer unit, an equalizer having arms positioned to make contact with and to actuate both of said distributors, a thrust element having one end connected to the brake pedal of the motor unit and the other end pivotally connected to a first shallow cup, a second shallow cup axially spaced from said first cup, a rod having one end connected to said second shallow cup, the other end of said rod bearing upon said equalizer between its points of contact with said distributor sections and providing a fulcrum point about which said equalizer may rock, a regulating spring mounted between said first and second shallow cups urging said thrust element away from said equalizer, a tension spring operatively connected between one arm of said equalizer and said first shallow cup urging the end of said equalizer adjacent the motor unit distributor toward said brake pedal, whereby upon moving said thrust element toward said equalizer the end of said equalizer nearer the trailer distributor section contacts and actuates such section before the opposite end of said equalizer contacts and actuates the motor distributor section and upon further movement of said thrust element toward said equalizer both ends of said equalizer contact and actuate their respective distributors.

4. A compressed air distributor according to claim 3 wherein a manually adjustable pressure limiting device is provided, said device comprising a spring biased rod, the end of which is adapted to engage a radially extending stop plate operatively connected to said thrust element whereby upon movement of the spring biased rod into the path of movement of said thrust element, the movement of the thrust element is limited to thereby restrict to a predetermined value the maximum braking pressure in both of said distributors.

References Cited in the file of this patent

UNITED STATES PATENTS

| 2,370,597 | Wallerstein | Feb. 27, 1945 |
| 2,680,654 | Edge et al. | June 8, 1954 |
| 2,964,360 | Alfieri | Dec. 13, 1960 |

FOREIGN PATENTS

| 713,107 | Germany | Oct. 31, 1941 |
| 315,375 | Italy | Feb. 23, 1934 |
| 549,930 | Italy | Oct. 18, 1956 |